Patented Mar. 1, 1938

2,109,456

UNITED STATES PATENT OFFICE 2,109,456

ARALKYL ETHERS OF SUBSTITUTED PHENOLS

Shailer L. Bass and Edward M. Van Duzee, Midland, Mich., assignors to The Dow Chemical Company, Midland, Mich., a corporation of Michigan No Drawing. Application July 25, 1936, Serial No. 92,510

9 Claims. (Cl. 260—150)

The present invention concerns a new class of compounds, namely, the aralkyl ethers of the hydroxy-diphenyls and halo-hydroxy-diphenyls having the following formula:

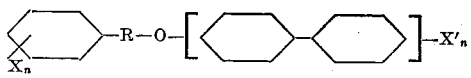

wherein X and X' represent the same or different halogen atoms or hydrogen, R is an alkylene radical, and $n$ is an integer not greater than 2.

We have prepared compounds of the aforementioned class, determined certain physical properties thereof whereby they may be readily identified, and found that they are particularly useful as intermediates for the manufacture of pharmaceuticals and as plasticizing agents for cellulose derivatives such as ethyl cellulose. The invention, then, consists in the new products hereinafter fully described and particularly pointed out in the claims.

The preparation of our new compounds can be accomplished by treating the alkali metal salt of a hydroxy-diphenyl or a halogen-substituted hydroxy-diphenyl directly with an aralkyl halide.

For example, a hydroxy-diphenyl compound is added to an alcoholic solution of metallic sodium, thereby producing an alcoholic phenolate solution. An aralkyl halide is then introduced slowly into said phenolate solution, maintained at its refluxing temperature, to form the desired ether product. The reaction mixture is then cooled and diluted with several volumes of water to precipitate therefrom a crude ether product, which may thereafter be separated in any convenient manner, such as by extraction with an organic solvent, decantation, etc. The crude product so obtained is washed with water and purified, as by distillation or fractional crystallization, to obtain the desired ether in substantially pure form.

Our new compounds may also be obtained by reacting a hydroxy-diphenyl compound with an aralkyl halide in the presence of an aqueous or aqueous-alcoholic solution of sodium hydroxide or other suitable alkali; or as by-products in the preparation of aralkylated hydroxy-diphenyls, such as 3-benzyl-4-hydroxy-diphenyl by the Claisen reaction, or, in certain cases, as a by-product in the condensation of aralkyl halides and the hydroxy-diphenyls with aluminum chloride.

The following examples describe in detail the preparation of certain specific members of our new class of compounds, but are offered only to illustrate the invention, and are not to be construed as limiting the same.

Example 1

23 grams (1 mole) of metallic sodium was digested with 500 milliliters of absolute alcohol, and 170.1 grams (1 mole) of 2-hydroxy-diphenyl reacted with the resulting alcoholate solution to form an alcoholic solution of the sodium salt of 2-hydroxy-diphenyl. This phenolate solution was warmed to its refluxing temperature and 126.5 grams (1 mole) of benzyl chloride added thereto over a period of one hour. Refluxing was continued thereafter for one hour under atmospheric pressure, after which the reaction mixture was cooled and diluted with approximately 3 volumes of water. A dark oil separated out of the aqueous alcoholic suspension and was extracted therefrom with benzene, washed with water to remove suspended sodium chloride, filtered, and the benzene removed by distillation at atmospheric pressure. The dark, viscous residue obtained thereby was fractionally distilled under reduced pressure, whereby there was obtained 192 grams (0.74 mole) of the benzyl ether of 2-hydroxy-diphenyl as a white crystalline solid boiling at 197° to 202° C. at 5 millimeters pressure and having a freezing point of 38.4° C.

Example 2

In a similar manner 23 grams (1 mole) of metallic sodium, 170.1 grams (1 mole) of 3-hydroxy-diphenyl and 126.5 grams (1 mole) of benzyl chloride were reacted. 174 grams (0.67 mole) of the benzyl ether of 3-hydroxy-diphenyl were formed thereby as a white crystalline solid boiling at 214° to 216.5° C. at 4 millimeters pressure, and freezing at 58.9° C.

Example 3

23 grams of metallic sodium and 170.1 grams (1 mole) of 4-hydroxy-diphenyl were reacted in 500 milliliters of absolute alcohol to form the corresponding sodium salt of 4-hydroxy-diphenyl. 126.5 grams (1 mole) of benzyl chloride was reacted therewith as described in Example 1, the product extracted with benzene, washed with water, and the benzene distilled off. The residue from the benzene distillation step was crystallized first from 95 per cent ethyl alcohol and then from benzene, yielding 131 grams (0.5 mole) of the benzyl ether of 4-hydroxy-diphenyl as a nearly white crystalline solid, melting at 136°–138° C.

Example 4

23 grams (1 mole) of metallic sodium, 204.6 grams (1 mole) of 2-hydroxy-3-chloro-diphenyl, and 126.5 grams (1 mole) of benzyl chloride were reacted as described in Example 1, and 240 grams (0.81 mole) of the benzyl ether of 2-hydroxy-3-chloro-diphenyl was obtained, boiling at 225°–231° C. at 4 millimeters pressure and having a freezing point of 56.7° C.

*Example 5*

17.3 grams (0.75 mole) of metallic sodium, 127.7 grams (0.75 mole) of 2-hydroxy-diphenyl, and 120.8 grams (0.75 mole) of 4-chloro-benzyl chloride were reacted as described in Example 1, the product being 141.9 grams (0.64 mole) of the 4-chloro-benzyl ether of 2-hydroxy-diphenyl, which is a white, crystalline solid boiling at 194°–197° C. at 1 millimeter pressure and having a freezing point of 51.8° C.

*Example 6*

In a similar manner 17.3 grams (0.75 mole) of sodium, 127.7 grams (0.75 mole) of 2-hydroxy-diphenyl, and 138.9 grams (0.75 mole) of beta-phenyl-ethyl bromide were reacted, thereby obtaining 87.9 grams (0.42 moles) of the beta-phenyl-ethyl ether of 2-hydroxy-diphenyl as a nearly white liquid compound boiling between 188° and 193° C. at 1 millimeter pressure and having a specific gravity of 1.098 at 20°/4° C.

In a similar manner other aralkyl halides may be reacted with the hydroxy-diphenyls to form compounds such as phenyl-butyl-ether of 2-hydroxy-diphenyl, phenyl-heptyl ether of 4-hydroxy-diphenyl, phenyl-octyl ether of 2-hydroxy-diphenyl, phenyl-nonyl ether of 4-hydroxy-diphenyl, etc. By substituting other halo-aralkyl halides and halo-hydroxy-diphenyls for the materials shown in the examples, compounds may be prepared such as phenyl-propyl ether of 4-hydroxy-4'-bromo-diphenyl, benzyl ether of 3-chloro-4'-bromo-4-hydroxy-diphenyl, 4-iodo-benzyl ether of 3-hydroxy-diphenyl, 3-bromo-phenyl-octyl ether of 2-hydroxy-3-chloro-diphenyl, 2.4-dichloro-benzyl ether of 4-hydroxy-3.5-dibromo-diphenyl, beta-2.4-dibromo-phenyl-ethyl ether of 2-hydroxy-3.5-dichloro-diphenyl, etc. In place of the sodium salts employed in the above examples, other alcohol-soluble metallic salts of the hydroxy-diphenyl compounds may be employed, for example, the potassium compounds, etc.

Other modes of applying the principle of our invention may be employed instead of those explained, change being made as regards the materials employed, provided the products described in the following claims be thereby obtained.

We therefore particularly point out and distinctly claim as our invention:

1. An aralkyl ether of a hydroxy-diphenyl compound having the formula:

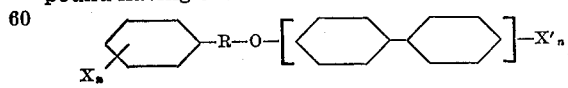

wherein R is an alkylene radical, X and X' represent a member of the group consisting of hydrogen and halogen, and each $n$ is an integer not greater than 2.

2. An aralkyl ether of a hydroxy-diphenyl compound having the formula:

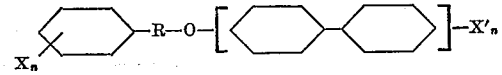

wherein R is an alkylene radical containing from 1 to 8 carbon atoms inclusive, X and X' represent a member of the group consisting of hydrogen and halogen, and each $n$ is an integer not greater than 2.

3. An aralkyl ether of a hydroxy-chloro-diphenyl having the formula:

wherein R is an alkylene radical, X represents a member of the group consisting of chlorine and hydrogen, and each $n$ is an integer not greater than 2.

4. A benzyl ether of a hydroxy-monochloro-diphenyl having the formula:

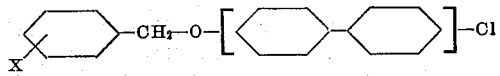

wherein X represents a member of the group consisting of chlorine and hydrogen.

5. A benzyl ether of a hydroxy-diphenyl compound having the formula:

wherein X and X' represent a member of the group consisting of halogen and hydrogen, and each $n$ is an integer not greater than 2.

6. A benzyl ether of a hydroxy-diphenyl compound having the formula:

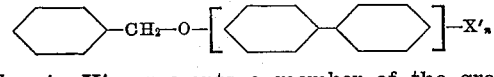

wherein X' represents a member of the group consisting of halogen and hydrogen, and $n$ is an integer not greater than 2.

7. A benzyl ether of a hydroxy-diphenyl having the formula:

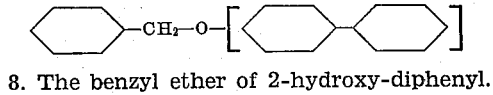

8. The benzyl ether of 2-hydroxy-diphenyl.
9. The benzyl ether of 3-hydroxy-diphenyl.

SHAILER L. BASS.
EDWARD M. VAN DUZEE.